No. 852,009. PATENTED APR. 30, 1907.
J. WOLF.
ANIMAL TRAP.
APPLICATION FILED JAN. 10, 1907.
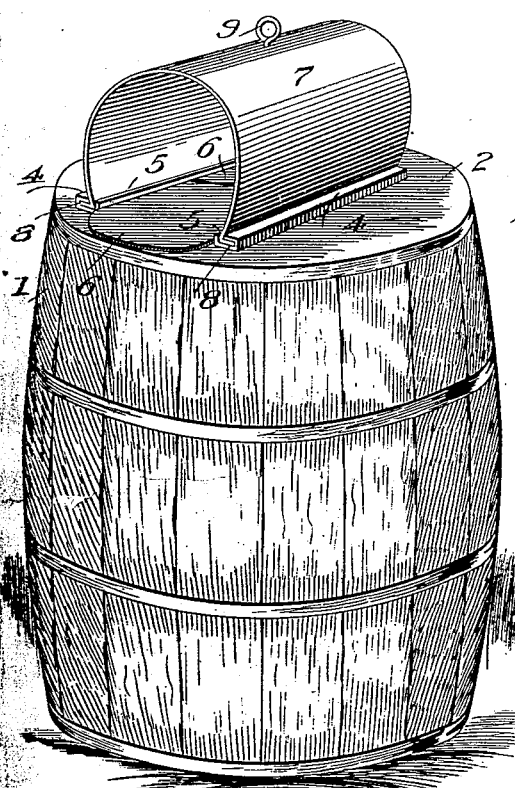
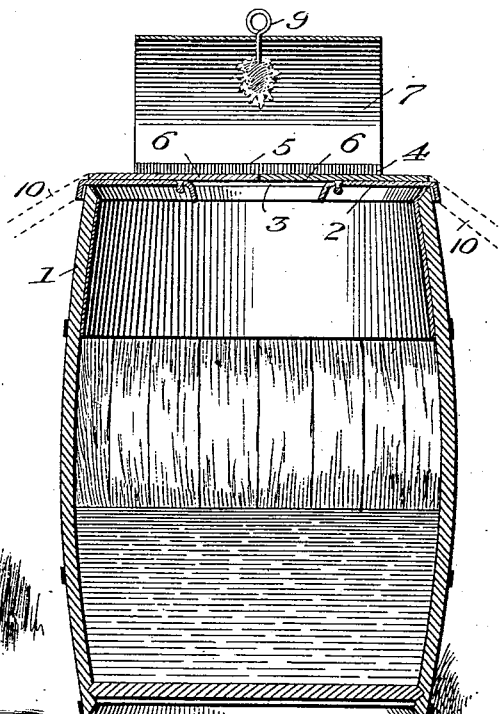
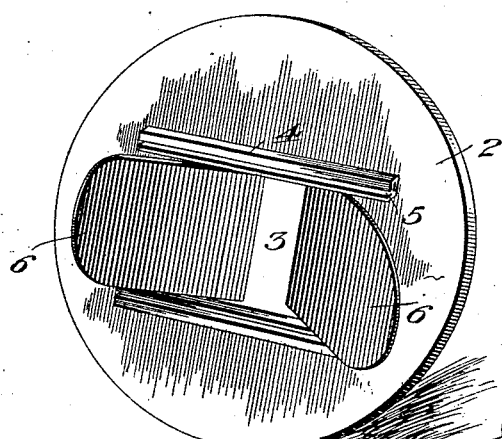
Inventor
John Wolf,
By Frank S. Appleman
Attorney
Witnesses
L. E. Barkley

UNITED STATES PATENT OFFICE.

JOHN WOLF, OF CARLISLE, PENNSYLVANIA.

ANIMAL-TRAP.

No. 852,009.  Specification of Letters Patent.  Patented April 30, 1907.

Application filed January 10, 1907. Serial No. 351,701.

*To all whom it may concern:*

Be it known that I, JOHN WOLF, a citizen of the United States of America, residing at Carlisle, in the county of Cumberland and State of Pennsylvania, have invented certain new and useful Improvements in Animal-Traps, of which the following is a specification.

This invention relates to new and useful improvements in traps and relates more especially to that class thereunder known as self-setting and ever-set traps.

It is an object of the invention to provide a novel device of this character which will cause the animal trapped to be thrown into a body of water although of course this feature may be omitted and a cage or other receptacle employed.

It is a further object of the invention to provide a device of this character wherein the tilting platforms are employed.

And further, it is an object of the invention to provide in conjunction with these platforms a novel hood for the purpose of directing or guiding the animals to the platforms.

Finally it is an object of this invention to produce a device of the character described, which will be simple in construction, efficient in practice and comparatively inexpensive to manufacture.

With the foregoing and other objects in view, the invention consists in the details of construction and in the arrangement and combination of parts to be hereinafter more fully set forth and claimed.

In describing the invention in detail reference will be had to the accompanying drawings forming part of this specification wherein like characters denote corresponding parts in the several views, in which—

Figure 1, is a perspective view of the invention in applied position. Fig. 2, is a sectional view of Fig. 1, said section being taken longitudinally of the device. Fig. 3, is a perspective view of the cover of the base of the trap, the platform thereof being shown in tilted position.

In the drawings 1, denotes a barrel or other water tight receptacle having its upper portion lined with tin or other material impervious to the attacks of animals. Fitting on the top of the barrel is a base 2, which entirely incloses the same and is provided with a central opening 3, preferably rectangular in section. Arranged adjacent the longitudinal edges of this opening are the guides 4, which consist of a slotted housing approximately square in cross section, the slots 5, thereof being positioned in the top thereof and adjacent the opening.

Pivoted to the housing above the opening 3, and at the ends thereof are the platforms 6. These platforms are of such size as to entirely close the opening 3, when in their normal or horizontal position, the opposing ends of said platforms being approximately flush one with the other. Each of these platforms is pivoted intermediate its length, the outer portions of said platforms extending nearly to the periphery of the base. This in practice has been found to be most advantageous as it assures that the animal is entirely on the platform before it passes the pivot to tilt the same and after said platform is tilted it presents an area of such size as to effectually prevent a retreat.

Attention is also directed to the fact that the ends of the opening 3, are provided with depending flanges which restrict the tilting of the platform and preventing them from swinging beneath the base 2, and thus become inoperative should the hood 7, be omitted.

Slidable within the guides 4, is a hood 7, approximately semi-circular in cross section. The free edges 8, of this hood are bent outwardly to provide means for preventing the hood being displaced by a vertical pull or turn thereon. The hood can be applied or removed only by means of a movement longitudinally of the guides. Approximately centrally of this hood depends a hook 9, to which bait is adapted to be secured.

The operation of the device is thought to be plainly apparent from the foregoing description but it may be further added that when the trap is placed upon a barrel or other receptacle projecting above the surface on which it rests, inclined gang-ways 10, may be used over which the animal may pass.

While this invention has been described as intended for use with animals, it has been found to operate with equal effect with the trapping of birds, it being stated that when the platforms tilt, the outer ends contact with the top of the hood and the only exit afforded is through the opening in the base. It is to be observed that the outer ends of the platforms are rounded to conform to the configuration of the hood.

Having fully described my invention what

I claim as new and desire to secure by Letters Patent, is—

In combination, a base having an opening, platforms pivoted intermediate their ends to the base, said pivotal points being at the ends of the opening in the base, guides arranged adjacent the longitudinal edges of the opening, said guides consisting of slotted housings approximately square in cross section, the slots being positioned in the top thereof and adjacent the openings and a hood movable in the guides, said hood having angular portions fitting within the guides.

In testimony whereof, I affix my signature in the presence of two witnesses.

JOHN WOLF.

Witnesses:
W. S. WAGNER,
C. M. LIGGETT.